(12) United States Patent
Qin

(10) Patent No.: US 11,928,802 B2
(45) Date of Patent: Mar. 12, 2024

(54) APPARATUS FOR ACQUIRING DEPTH IMAGE, METHOD FOR FUSING DEPTH IMAGES, AND TERMINAL DEVICE

(71) Applicant: SHENZHEN GOODIX TECHNOLOGY CO., LTD., Shenzhen (CN)

(72) Inventor: Xiage Qin, Shenzhen (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 70 days.

(21) Appl. No.: 17/860,579

(22) Filed: Jul. 8, 2022

(65) Prior Publication Data

US 2023/0042846 A1 Feb. 9, 2023

Related U.S. Application Data

(63) Continuation of application No. PCT/CN2021/111293, filed on Aug. 6, 2021.

(51) Int. Cl.
*G06T 5/50* (2006.01)
*G01S 17/48* (2006.01)
(Continued)

(52) U.S. Cl.
CPC .............. *G06T 5/50* (2013.01); *G01S 17/48* (2013.01); *G01S 17/86* (2020.01); *G01S 17/894* (2020.01);
(Continued)

(58) Field of Classification Search
CPC .. G06T 5/50; G06T 7/30; G06T 7/521; G06T 2207/10024; G06T 2207/10028;
(Continued)

(56) References Cited

U.S. PATENT DOCUMENTS 9,769,456 B2 * 9/2017 You ..................... H04N 13/254
11,146,735 B2 * 10/2021 Guo ..................... H04N 23/72
2017/0127036 A1 5/2017 You et al.

FOREIGN PATENT DOCUMENTS

CN 108269238 A * 7/2018 ............. G06T 5/002
CN 108716983 A 10/2018
(Continued)

OTHER PUBLICATIONS

Xule Yan et al., Super-resolution reconstruction for depth map based on edge enhancement, Journal of Optoelectronic Laser, vol. 27 No. 4, Apr. 2016, p. 437-447.

*Primary Examiner* — Ahmed A Berhan
(74) *Attorney, Agent, or Firm* — Emerson, Thomson, & Bennett, LLC; Roger D. Emerson; Matt J. Wilson

(57) ABSTRACT

Provided are an apparatus for acquiring a depth image, a method for fusing depth images, and a terminal device. The apparatus for acquiring a depth image includes an emitting module, a receiving module, and a processing unit. The emitting module is configured to emit a speckle array to an object, where the speckle array includes p mutually spaced apart speckles. The receiving module includes an image sensor. The processing unit is configured to receive the pixel signal and generate a sparse depth image based on the pixel signal, align an RGB image at a resolution of a*b with the sparse depth image, and fuse the aligned sparse depth image with the RGB image using a pre-trained image fusion model to obtain a dense depth image at a resolution of a*b.

20 Claims, 4 Drawing Sheets

(51) Int. Cl.
*G01S 17/86* (2020.01)
*G01S 17/894* (2020.01)
*G06T 7/30* (2017.01)
*G06T 7/521* (2017.01)
*H04N 23/56* (2023.01)

(52) U.S. Cl.
CPC ............... *G06T 7/30* (2017.01); *G06T 7/521* (2017.01); *H04N 23/56* (2023.01); *G06T 2207/10024* (2013.01); *G06T 2207/10028* (2013.01); *G06T 2207/20081* (2013.01); *G06T 2207/20221* (2013.01)

(58) Field of Classification Search
CPC . G06T 2207/20081; G06T 2207/20221; G06T 2207/20084; G01S 17/48; G01S 17/86; G01S 17/894; H04N 23/56
See application file for complete search history.

(56) References Cited

FOREIGN PATENT DOCUMENTS

| | | |
|---|---|---|
| CN | 109685842 A | 4/2019 |
| CN | 110992271 A | 4/2020 |
| CN | 112950694 A | 6/2021 |

\* cited by examiner

APPARATUS FOR ACQUIRING DEPTH IMAGE, METHOD FOR FUSING DEPTH IMAGES, AND TERMINAL DEVICE

CROSS-REFERENCE TO RELATED APPLICATIONS

The present disclosure is a continuation of international application No. PCT/CN2021/111293 filed on Aug. 6, 2021, and entitled "APPARATUS FOR ACQUIRING DEPTH IMAGE, METHOD FOR FUSING DEPTH IMAGES, AND TERMINAL DEVICE", which is incorporated herein by reference.

TECHNICAL FIELD

Embodiments of the present disclosure relates to the field of image processing, and particularly relates to an apparatus for acquiring a depth image, a method for fusing depth images, and a terminal device.

BACKGROUND

In general, when acquiring an image using an RGB camera, a terminal device, such as a mobile phone, can only obtain two-dimensional planar information, but cannot obtain accurate depth information, thereby restricting usage scenarios of the terminal device.

A sensor, such as lidar, can obtain a line-scanned sparse depth image, and further, can complement the sparse depth image to obtain a dense depth image, to meet application scenarios related to three-dimensional images.

However, due to the high costs of such a sensor as lidar, a lower-cost depth image solution is required for the terminal device, such as a mobile phone.

SUMMARY

In view of this, one of the technical problems to be solved in embodiments of the present disclosure is to provide an apparatus for acquiring a depth image, a method for fusing depth images, and a terminal device.

In a first aspect of the embodiments of the present disclosure, an apparatus for acquiring a depth image is provided, including: an emitting module configured to emit a speckle array to an object, where the speckle array includes p mutually spaced apart speckles; a receiving module including an image sensor, the image sensor including a sensor array, the sensor array including m*n pixel units, where each of the pixel units includes a CMOS photodiode and a photoelectric signal reading circuit, the photodiode is configured to receive the speckle array reflected by the object, and generate a corresponding photocurrent signal based on the speckle array, a current intensity indicated by the photocurrent signal is positively correlated with a light intensity of light beam irradiation received by the photodiode, and the photoelectric signal reading circuit is configured to read the photocurrent signal and output a corresponding pixel signal; and a processing unit configured to receive the pixel signal and generate a sparse depth image based on the pixel signal, the number p of speckles indicating a resolution of the sparse depth image, where the processing unit is further configured to align an RGB image at a resolution of a*b with the sparse depth image, and fuse the aligned sparse depth image with the RGB image using a pre-trained image fusion model to obtain a dense depth image, where the dense depth image is at a resolution of a*b.

In a second aspect of the embodiments of the present disclosure, a method for fusing depth images is provided. The method for fusing depth images is applied to a terminal device including a depth camera and an RGB camera. The method includes: acquiring a sparse depth image at a resolution of p using the depth camera based on IToF principle, and acquiring an RGB image using the RGB camera; aligning the sparse depth image at the resolution of p with the RGB image at a resolution of a*b; and fusing the aligned sparse depth image and the RGB image using a pre-trained image fusion model to obtain a dense depth image at a resolution of a*b.

In a third aspect of the embodiments of the present disclosure, a terminal device is provided, including: a depth camera acquiring a sparse depth image at a resolution of p based on IToF principle; an RGB camera acquiring an RGB image at a resolution of a*b; a memory storing a pre-trained image fusion model; and a processor aligning the sparse depth image at the resolution of p with the RGB image at the resolution of a*b, and fusing the aligned sparse depth image and the RGB image using the image fusion model to obtain a dense depth image at a resolution of a*b.

In the solutions of the embodiments of the present disclosure, both image collection and sparse depth image acquisition based on the IToF principle contribute to reducing the costs of acquiring image depth information. In other words, the depth camera in the embodiments of the present disclosure collects the sparse depth image based on the IToF principle, thereby contributing to reducing the configuration costs of the depth camera, making such a depth camera be more adapted to a low-cost terminal device such as a mobile phone, and reducing the costs of the terminal device. In addition, the aligned sparse depth image and the RGB image are fused by the pre-trained image fusion model, thereby improving the precision of image fusion, and improving the efficiency of image processing. In addition, the sparse depth image and the RGB image are fused to obtain a dense depth image with higher precision, thereby enriching usage scenarios of the terminal device, and improving the user experience.

BRIEF DESCRIPTION OF THE DRAWINGS

Some specific embodiments among embodiments of the present disclosure will be described in detail below with reference to the accompanying drawings in an exemplary manner, instead of a limiting manner. Identical reference numerals in the drawings represent identical or similar components or parts. Those skilled in the art should understand that these drawings may not be drawn to scale. In the drawings.

DETAILED DESCRIPTION OF EMBODIMENTS

Figure 1:
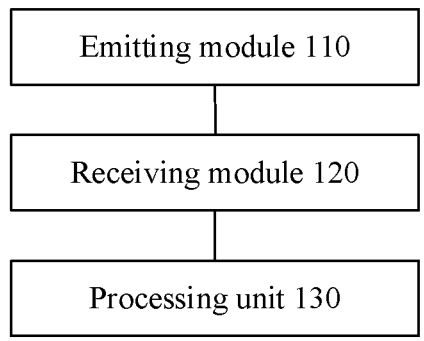
FIG. 1 is a schematic block diagram of an apparatus for acquiring a depth image in an embodiment of the present disclosure.

Specific implementations of embodiments of the present disclosure will be further described below with reference to the accompanying drawings in the embodiments of the present disclosure.

The solutions of the embodiments of the present invention may be adapted to any computer device with a data processing power, including but not limited to a mobile communication device, an ultra-mobile personal computer device, a portable entertainment device, and other terminal devices with data interaction functions.

In general, the mobile communication device is characterized by having mobile communication functions, is mainly intended to provide voice and data communication, and includes: a smart phone (e.g., iPhone), a multimedia phone, a functional phone, a low-end phone, and the like. In addition, the ultra-mobile personal computer device belongs to a category of personal computers, has computing and processing functions, generally also has the characteristics of mobile Internet access, and includes: PDA, MID, UMPC devices, and the like, e.g., iPad. In addition, the portable entertainment device may display and play multimedia contents, and includes: an audio player, a video player (e.g., an iPod), a handheld game player, an e-book, a smart toy, and a portable vehicle navigation device.

On the one hand, various terminal devices are characterized by portability (for example, miniaturized devices or wearable devices) and low costs. Further, the terminal devices are expected to further have strong image processing power, thereby providing more abundant functions and better user experience.

On the other hand, the terminal device is highly popular, there are a large number of terminal devices, and relatively mature upstream and downstream industrial chains of terminal device production and assembly have been gradually formed. For example, various kinds of sensor hardware required by the terminal device are specially provided by downstream hardware manufacturers of terminal device assemblers or foundries. Software algorithms (for example, operating systems or neural network models) with strong data processing power in the terminal device are also specially provided by corresponding downstream software manufacturers. In this way, both software manufacturers and hardware manufacturers provide upstream manufacturers with corresponding high-performance software products or high-performance hardware products, and software manufacturers or hardware manufacturers themselves often will not integrate others' products with their own products, such that it is difficult for downstream suppliers to provide both software products and hardware products to upstream suppliers. In other words, this technical and professional division of labor not only enables downstream manufacturers to provide higher-performance products, but also guarantees the overall production efficiency of the terminal device, thereby satisfying the device performance and the output of the terminal device.

Under such a technical background, an embodiment of the present disclosure provides an image fusion solution. An apparatus for acquiring a depth image in an embodiment of the present disclosure will be specifically described below with reference to FIG. 1.

The apparatus for acquiring a depth image in FIG. 1 includes:

an emitting module 110 configured to emit a speckle array to an object, where the speckle array includes p mutually spaced apart speckles;

a receiving module 120 including an image sensor, the image sensor including a sensor array, the sensor array including m*n pixel units, where each of the pixel units includes a CMOS photodiode and a photoelectric signal reading circuit, the photodiode is configured to receive the speckle array reflected by the object, and generate a corresponding photocurrent signal based on the speckle array, a current intensity indicated by the photocurrent signal is positively correlated with a light intensity of light beam irradiation received by the photodiode, and the photoelectric signal reading circuit is configured to read the photocurrent signal and output a corresponding pixel signal; and a processing unit 130 configured to receive the pixel signal and generate a sparse depth image based on the pixel signal, the number p of speckles indicating a resolution of the sparse depth image, where the processing unit is further configured to align an RGB image at a resolution of a*b with the sparse depth image, and fuse the aligned sparse depth image with the RGB image using a pre-trained image fusion model to obtain a dense depth image, where the dense depth image is at a resolution of a*b.

It should be understood that the generating the sparse depth image based on the pixel signal includes: emitting a speckle light array with a first phase for an object through a point light source array, acquiring a reflected speckle light array with a second phase of the detection light, and determining the sparse depth image at least based on a difference between a grayscale image in the first phase of the speckle light array and a grayscale image in the second phase of the reflected speckle light array.

It should be further understood that a conventional lidar (e.g., a dToF camera and a LiDAR) generally employs an avalanche photo diode (APD), such as a single-photon avalanche photo diode, while the embodiment of the present disclosure employs a low-cost CMOS photodiode, the performance of which can guarantee the effect of IToF measurement.

It should be further understood that the resolution of the sparse depth image refers to the number of points or the number of depth values of the depth image, i.e., the number p of speckles or an approximate value of the number of speckles indicates the resolution of the sparse depth image. For example, the emitting module includes a light-emitting array with q light-emitting points and a light-emitting drive circuit controlled by an emission pulse signal to drive the q light-emitting points to emit light to generate the p speckles, where p=s*q, and s is an integer greater than or equal to 1. However, usually, a resolution of a two-dimensional image is characterized with the pixel number in two dimensions, for example, the RGB image of a*b. A dense fused image obtained using the fusion method in the embodiment of the present disclosure includes a*b pixels, and each pixel has depth information. Therefore, a*b indicates a resolution of the dense fused image.

It should be further understood that image collection of an object area in the present embodiment includes two portions, i.e., acquiring a sparse depth image using a depth camera based on the principle of indirect time of flight (IToF), and acquiring an RGB image using an RGB camera. RGB refers to colors that represent a red channel, a green channel, and a blue channel. The RGB camera is a camera that collects images based on an RGB color mode, and the images collected by the RGB camera are RGB images. Specifically, as a color standard in the industrial circle, the RGB color mode obtains various colors by changing the red channel, the green channel, and the blue channel, and superimposing them on each other. The RGB image may be an image of the object area collected using an RGB camera, and an imaging result of the object area may be recorded using pixels of the above three color channels. The RGB camera in the present disclosure encompasses a color camera in a broad sense, and the RGB camera is not necessarily required to have an RGB filter layer. Similar image sensors having color filter arrays, such as RGGB, RGBW, and RYYB, are adapted to the method for fusing depth images in the embodiment of the present disclosure.

It should be further understood that the sparse depth image may be obtained by a depth camera through image collection based on the IToF principle. The depth camera in the embodiment of the present disclosure may be provided with a speckle light source, i.e., a light source formed by an array of separate point light sources. This depth camera may also be referred to as a speckle IToF camera. Sparse (speckle) point light sources are projected by the speckle IToF camera. Accordingly, sparse depth images are obtained, and the sparsity of the depth images collected by the speckle IToF camera depends on the number of points of the speckle light source.

It should be further understood that, in general, a conventional area light source IToF camera performs image collection based on the IToF principle, but the area light source IToF camera has a very limited detection distance and large power consumption. Different from the area light source IToF camera, the speckle IToF camera has lower light emission power, higher energy density, and farther detection distance, and can obtain depth images with more depth information. In other words, sparse depth images are collected by the speckle IToF camera, but the array of separate point light sources further guarantees the low costs of this camera and the quality of depth information.

A depth camera with a speckle light source (speckle IToF camera) in the embodiment of the present disclosure is different from a sensor such as lidar. For example, the lidar obtains depth information for the purpose of, e.g., object ranging and object tracking, based on the principle of direct time of flight (DToF). Therefore, such a sensor is expensive with a large physical size, and is neither adapted to low-cost terminal devices, nor adapted to portable devices or wearable devices. The depth camera with a speckle light source obtains depth information of a target object or object area based on the IToF principle, and thus is inexpensive. In addition, the speckle light source contributes to guaranteeing the quality of the depth information.

In some other examples, the photoelectric signal reading circuit is controlled by a read control signal to output the pixel signal, where a pixel signal of each pixel unit includes a first phase pixel signal, a second phase pixel signal, a third phase pixel signal, and a fourth phase pixel signal, where phase differences between the read control signals corresponding to the first phase pixel signal, the second phase pixel signal, the third phase pixel signal, and the fourth phase pixel signal respectively are 90° successively, and the processing unit generates the sparse depth image based on the first phase pixel signal, the second phase pixel signal, the third phase pixel signal, and the fourth phase pixel signal, and the phase of the read control signal corresponding to the obtained first phase pixel signal is the same as the phase of the transmission pulse, thereby reliably achieving IToF detection of the sparse depth image.

In some other examples, the photoelectric signal reading circuit only reads all pixel units of the pixel row irradiated by the speckle.

In some other examples, the processing unit is specifically configured to: align the sparse depth image with the RGB image.

Specifically, this process may also be referred to as image registration. Based on such a configuration, the sparse depth image is aligned with the RGB image based on camera parameters, thereby resulting in a high matching degree between the sparse depth image and the RGB image, and improving the fusion precision of the trained image fusion model. Alignment reflects the correspondence between respective collection objects of the sparse depth image and the RGB image. When the aligned images are fused, each part (for example, pixel) of each image (the aligned sparse depth image and the RGB image) involved in the fusion corresponds to each part in the fused image, such that each part gathers depth information in the sparse depth image and non-depth information in the RGB image, thus obtaining a reliable fused depth image.

In some other examples, the processing unit is further configured to: acquire training samples, where the training samples include an aligned sparse depth image sample at a resolution of p, an RGB image sample at a resolution of a*b, and a dense depth image sample at a resolution of a*b. The processing unit is specifically configured to: train an object neural network with the aligned sparse depth image sample and the RGB image sample as inputs and with the dense depth image sample as a supervision condition, to obtain the image fusion model.

It should be understood that the depth camera and the RGB camera that collect the training samples may be calibrated to obtain camera parameters, and the sparse depth image sample may be aligned with the RGB image sample based on the camera parameters. The camera parameters of the depth camera and the RGB camera that collect the training samples may be the same as, and of course, may also be different from, camera parameters of a depth camera and an RGB camera that collect to-be-fused images.

In a specific example, the above training samples may be collected using a camera module including the depth camera and the RGB camera. In this case, the camera parameters of the depth camera and the RGB camera that collect the training samples may be the same as the camera parameters of the depth camera and the RGB camera that collect the to-be-fused images.

In some other examples, the processing unit is specifically configured to: input the aligned sparse depth image and the RGB image into the pre-trained image fusion model to obtain the dense depth image.

It should be understood that, as a terminal-to-terminal neural network model, the image fusion model improves the efficiency of image fusion, and improves the efficiency of data processing on the premise of guaranteeing the precision of image fusion.

In some other examples, the processing unit is further configured to: acquire an image acquiring instruction of a three-dimensional image application program installed in a terminal device, the image acquiring instruction instructing the receiving module and the emitting module to collect the sparse depth image and the RGB image respectively; and return the dense depth image to the three-dimensional image application program, such that the three-dimensional image application program acquires three-dimensional image information based on the dense depth image.

It should be understood that the three-dimensional image application program may include any one of an image background blurring application, a three-dimensional image reconstruction application, a virtual reality application, or an augmented reality application.

For example, an operating system may be installed in the terminal device, and the three-dimensional image application program runs on the operating system. The operating system includes, but is not limited to, an embedded operating system, a real-time operating system, and the like. The three-dimensional image application program may be a system application program, or may be a third-party application program. For example, the camera module including the depth camera and the RGB camera may start to perform image collection in response to the image acquiring instruction of the three-dimensional image application program.

The three-dimensional image application program may issue an image acquiring instruction (in response to a user instruction or other associated instructions, or the like). The three-dimensional image application program may invoke the image fusion model to input the aligned sparse depth image and the RGB image into the image fusion model to obtain the dense depth image.

Figure 2A:
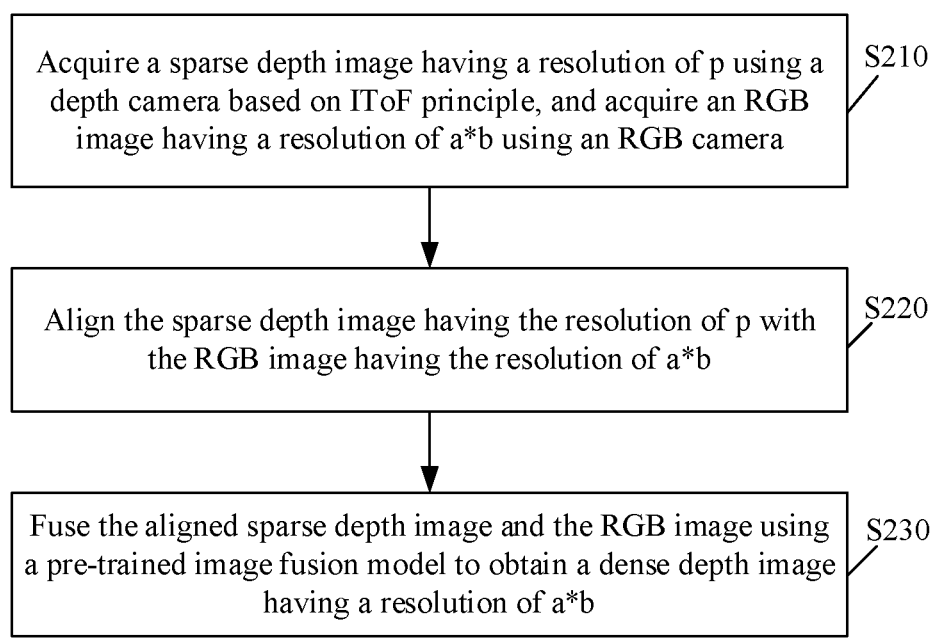
FIG. 2A is a schematic flowchart of a method for fusing depth images in another embodiment of the present disclosure.

A method for fusing depth images in an embodiment of the present disclosure will be specifically described below with reference to FIG. 2A. The method for fusing depth images in FIG. 2A includes:

S210: acquiring a sparse depth image at a resolution of p using a depth camera based on IToF principle, and acquiring an RGB image at a resolution of a*b using an RGB camera.

It should be understood that RGB refers to colors that represent a red channel, a green channel, and a blue channel. The RGB camera is a camera that collects images based on an RGB color mode, and the images collected by the RGB camera are RGB images. Specifically, as a color standard in the industrial circle, the RGB color mode obtains various colors by changing the red channel, the green channel, and the blue channel, and superimposing them on each other. The RGB image may be an image of the object area collected using an RGB camera, and an imaging result of the object area may be recorded using pixels of the above three color channels. The RGB camera in the present disclosure encompasses a color camera in a broad sense, and the RGB camera is not necessarily required to have an RGB filter layer. Similar image sensors having color filter arrays, such as RGGB, RGBW, and RYYB, are adapted to the method for fusing depth images in the embodiment of the present disclosure.

It should be further understood that the sparse depth image may be obtained by a depth camera through image collection based on the IToF principle. The depth camera in the embodiment of the present disclosure may be provided with a speckle light source, i.e., a light source formed by an array of separate point light sources. This depth camera may also be referred to as a speckle IToF camera. Sparse (speckle) point light sources are projected by the speckle IToF camera. Accordingly, sparse depth images are obtained, and the sparsity of the depth images collected by the speckle IToF camera depends on the number of points of the speckle light source.

It should be further understood that, in general, a conventional area light source IToF camera performs image collection based on the IToF principle, but the area light source IToF camera has a very limited detection distance and large power consumption. Different from the area light source IToF camera, the speckle IToF camera has lower light emission power, higher energy density, and farther detection distance, and can obtain depth images with more depth information. In other words, sparse depth images are collected by the speckle IToF camera, but the array of separate point light sources further guarantees the low costs of this camera and the quality of depth information.

A depth camera with a speckle light source (speckle IToF camera) in the embodiment of the present disclosure is different from a sensor such as lidar. For example, the lidar obtains depth information for the purpose of, e.g., object ranging and object tracking, based on the principle of direct time of flight (DToF). Therefore, such a sensor is expensive with a large physical size, and is neither adapted to low-cost terminal devices, nor adapted to portable devices or wearable devices. The depth camera with a speckle light source obtains depth information of a target object or object area based on the IToF principle, and thus is inexpensive. In addition, the speckle light source contributes to guaranteeing the quality of the depth information.

It should be further understood that the resolution of the sparse depth image refers to the number of points or the number of depth values of the depth image, i.e., the number p of speckles or an approximate value of the number of speckles indicates the resolution of the sparse depth image. For example, the emitting module includes a light-emitting array with q light-emitting points and a light-emitting drive circuit controlled by an emission pulse signal to drive the q light-emitting points to emit light to generate the p speckles, where p=s*q, and s is an integer greater than or equal to 1. However, usually, a resolution of a two-dimensional image is characterized with the pixel number in two dimensions, for example, the RGB image of a*b. A dense fused image obtained using the fusion method in the embodiment of the present disclosure includes a*b pixels, and each pixel has depth information. Therefore, a*b indicates a resolution of the dense fused image.

S220: aligning the sparse depth image at the resolution of p with the RGB image at the resolution of a*b.

It should be understood that the alignment herein aims at least to fuse the depth image collected by the depth camera with the RGB image collected by the RGB camera with respect to the same object collection area.

It should be further understood that the sparse depth image may be aligned with the RGB image based on calibration parameters of the depth camera and the RGB camera. Since the depth camera and the RGB camera collect images based on their respective local coordinate systems, when a plurality of (two or more) images is fused, it is necessary to align the plurality of images to the same coordinate system, and it is considered that position coordinates of each image in the same coordinate system indicate and correspond to the same spatial position in the world coordinate system, thereby fusing the plurality of images based on the corresponding positional relationship. In addition, the same coordinate system may be a local coordinate system of any camera, or may be the world coordinate system. In addition, different cameras have different setting positions or angles (spatial directions), collect corresponding images that usually do not correspond to the same coordinate system, and may obtain a transformation relationship between the local coordinate system of each camera and the world coordinate system based on camera parameters (for example, an internal parameter and an external parameter) of each camera, thereby aligning images collected by each camera based on the camera parameters of each camera, i.e., aligning the sparse depth image with the RGB image.

In addition, the sparse depth image may also be aligned with the RGB image based on image information. For example, the sparse depth image and the RGB image may be determined to correspond to their respective position features in the same object area, and image fusion may be performed based on their respective position features.

S230: fusing the aligned sparse depth image and the RGB image using a pre-trained image fusion model to obtain a dense depth image at a resolution of a*b.

It should be understood that training samples of the image fusion model are aligned sparse depth image sample and RGB image sample. The sparse depth image sample and the RGB image sample may be collected by the depth camera and the RGB camera, respectively. The depth camera may be the same camera or the same type of camera as the camera that collects the sparse depth image (to-be-fused image), and the RGB camera may also be the same camera or the same type of camera as the camera that collects the RGB image (to-be-fused image). When the camera that collects the training samples and the camera that collects the to-be-fused image are of the same type, a high matching degree between training sample data and to-be-fused image data can improve the image fusion effect of the model.

It should be further understood that the image fusion model in the embodiment of the present disclosure may be a terminal-to-terminal neural network model, in other words, an input of the image fusion model is the to-be-fused image, and an output of the image fusion model is the fused image. The to-be-fused image includes a sparse depth image with depth information and an RGB image with different color channel information, and the above image information may be image complemented by image fusion to obtain the dense depth image.

It should be further understood that the neural network may be trained using the above training samples, thereby obtaining the image fusion model in the embodiments of the present disclosure. The neural network in the present embodiment includes, but is not limited to, a convolutional neural network (CNN), a feedforward neural network, a generative adversarial network (GAN), and an encoder-decoder network of, e.g., a transformer. In addition, the training approach in the embodiments of the present disclosure includes, but is not limited to, supervised learning, unsupervised learning, and semi-supervised learning.

In the solution of the embodiment of the present disclosure, since the depth camera can collect the sparse depth image, the cost of acquiring the sparse depth image using the depth camera based on the IToF principle is low, thereby reducing the cost of acquiring image depth information. The depth camera can be adapted to a low-cost terminal device, such as a mobile phone. In addition, the aligned sparse depth image and the RGB image are fused by the pre-trained image fusion model, thereby improving the precision of image fusion, and improving the efficiency of image processing. In addition, the sparse depth image and the RGB image are fused to obtain a dense depth image with higher precision, thereby enriching usage scenarios of the terminal device, and improving the user experience.

In addition, due to the high popularity of RGB cameras, the multiplexing of an RGB camera can be realized in a terminal device equipped with the RGB camera. In other words, in an application scenario where depth images are not required, the RGB camera can still be used to perform conventional image collection.

In addition, the solution of the embodiment of the present disclosure realizes a low-cost depth camera, such that in the industrial chain of terminal devices, the depth camera as a high-performance hardware product and the image fusion model as a high-performance software product can be fused together. In other words, the depth camera and the image fusion model may be provided to upstream manufacturers by the same downstream manufacturer as a high-performance image processing solution, whilst guaranteeing the production efficiency of the entire industrial chain.

Figure 2B:
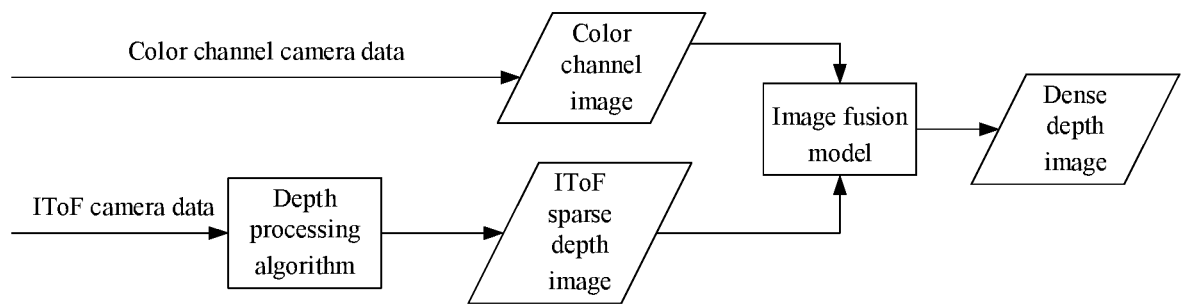
FIG. 2B is a schematic block diagram of an example of the method for fusing depth images in FIG. 2A.

The method for fusing depth images is further described below with reference to FIG. 2B. FIG. 2B shows a schematic block diagram of an example of the method for fusing depth images in FIG. 2A. As shown in FIG. 2B, an RGB image of an object area may be obtained based on RGB camera data, for example, an RGB image as a two-dimensional color image. In addition, a sparse depth image may be collected by a depth camera, for example, the sparse depth image may be obtained by image depth processing based on a speckle distribution image collected by the depth camera. Then, a dense depth image is obtained by image fusion of the RGB image and the sparse depth image using a pre-trained image fusion model.

It should be understood that the depth camera herein may include an emitting module, a receiving module, and a processing unit. The emitting module may be configured to emit a speckle array (point light source array) to an object. The speckle array may include p mutually spaced apart speckles. In addition, the receiving module may include an image sensor, the image sensor may include a sensor array, and the sensor array may include m*n pixel units, where each of the pixel units includes a CMOS photodiode and a photoelectric signal reading circuit, the photodiode is configured to receive the speckle array reflected by the object, and generate a corresponding photocurrent signal based on the speckle array, and a current intensity indicated by the photocurrent signal is positively correlated with a light intensity of light beam irradiation received by the photodiode. The photoelectric signal reading circuit is configured to read the photocurrent signal and output a corresponding pixel signal; and the processing unit is configured to receive the pixel signal and generate a sparse depth image based on the pixel signal, the number p of speckles indicates a resolution of the sparse depth image, and the processing unit is further configured to align an RGB image at a resolution of a*b with the sparse depth image, and fuse the aligned sparse depth image with the RGB image using a pre-trained image fusion model to obtain a dense depth image, where the dense depth image is at a resolution of a*b.

It should be further understood that the emitting module may include a light-emitting array with q light-emitting points and a light-emitting drive circuit controlled by an emission pulse signal to drive the q light-emitting points to emit light to generate the p speckles, where p=s*q, and s is an integer greater than or equal to 1.

It should be further understood that the photoelectric signal reading circuit may be controlled by a read control signal to output the pixel signal, where a pixel signal of each pixel unit includes a first phase pixel signal, a second phase pixel signal, a third phase pixel signal, and a fourth phase pixel signal, where phase differences between the read control signals corresponding to the first phase pixel signal, the second phase pixel signal, the third phase pixel signal, and the fourth phase pixel signal respectively are 90° successively, and the processing unit generates the sparse depth image based on the first phase pixel signal, the second phase pixel signal, the third phase pixel signal, and the fourth phase pixel signal, and the phase of the read control signal corresponding to the obtained first phase pixel signal is the same as the phase of the transmission pulse.

Figure 3:
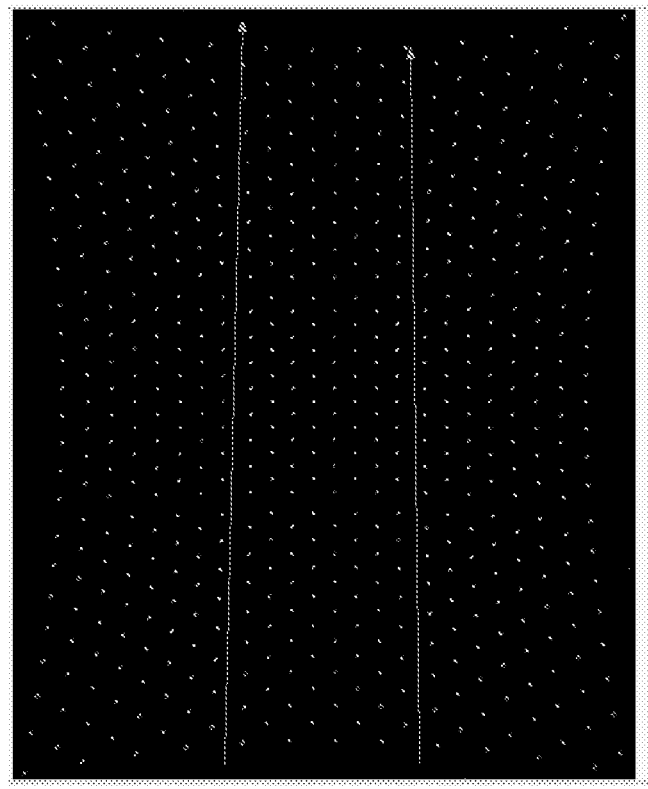
FIG. 3 is a schematic diagram of a speckle distribution diagram of a depth camera in an example of the method for fusing depth images in FIG. 2A.

FIG. 3 shows a schematic diagram of a speckle distribution diagram. The speckle distribution image is an image collected by a point light source array provided in a depth camera. In addition, a distribution diagram of light reflected from an object area or a target object of light of the point light source array in the image corresponds to the speckle distribution diagram. The convergence of light emitted from each point light source in such a point light source array is much better than that of light emitted from an area light source. The depth camera can obtain a sparse depth image with high-quality depth information using such a point light source array based on a low-cost IToF processing module.

In some other examples, the aligning the sparse depth image at the resolution of p with the RGB image at the resolution of a*b includes: aligning the sparse depth image at the resolution of p with the RGB image at the resolution of a*b based on camera parameters calibrated for the depth camera and the RGB camera. Based on such a configuration, the sparse depth image is aligned with the RGB image based on the camera parameters, thereby resulting in a high matching degree between the sparse depth image and the RGB image, and improving the fusion precision of the trained image fusion model. From the intuitive perspective, alignment reflects the correspondence between respective collection objects of the sparse depth image and the RGB image. When the aligned images are fused, each part (for example, pixel) of each image (the aligned sparse depth image and the RGB image) involved in the fusion corresponds to each part in the fused image, such that each part gathers depth information in the sparse depth image and non-depth information in the RGB image, thus obtaining a reliable fused depth image.

Specifically, the calibration parameters indicate a transformation relationship between a camera coordinate system and the world coordinate system, and the sparse depth image is aligned with the RGB image based on the calibration parameters, thereby improving the matching degree between the sparse depth image and the RGB image. The calibration parameters include a camera internal parameter and a camera external parameter. In general, the camera external parameter indicates the mapping from the world coordinate system to the camera coordinate system, and the camera internal parameter indicates the mapping from the camera coordinate system to an image coordinate system. In addition, the calibration of the parameters of the depth camera and the RGB camera may be performed before image collection is performed. The obtained calibration parameters may be pre-stored, and then the pre-stored calibration parameters may be obtained.

In some other examples, the depth camera and the RGB camera are provided in a camera module, and the camera parameters are obtained by camera calibration based on the camera module.

Specifically, the depth camera and the RGB camera may be combined or assembled into a camera module, and then the camera module may be assembled into a terminal device as an integral part, to improve the device assembly efficiency. In other words, the camera module may be arranged in different devices as an independent component, and the calibration parameters of the camera module do not change with the device where it is located, thereby improving the setting flexibility of the camera module as an acquiring device.

In addition, once the calibration parameters of the depth camera and the RGB camera are determined, the camera module provided with the depth camera and the RGB camera is also determined. In addition, the calibration parameters may be stored in a memory module of the camera module. Specifically, the internal parameters and the external parameters of the depth camera and the RGB camera may be calibrated respectively for the camera module. Or, the internal parameters of the depth camera and the RGB camera may be calibrated before the depth camera and the RGB camera are assembled into the camera module, the external parameters of the depth camera and the RGB camera may be calibrated after the depth camera and the RGB camera are assembled into the camera module, and their respective internal parameters may be obtained after the depth camera and the RGB camera leave the factory and before the depth camera and the RGB camera are assembled into the camera module. In this way, it is only necessary to calibrate external parameters indicating a relative direction relationship between the cameras after assembly, thereby improving the efficiency of parameter calibration after assembly.

In some other examples, the depth camera is provided with a point light source array, and accordingly, the acquiring the sparse depth image at the resolution of p using the depth camera based on the IToF principle includes: emitting detection light with a first phase for an object area through the point light source array, and acquiring reflected light with a second phase of the detection light; and determining the sparse depth image at the resolution of p at least based on a difference between a grayscale image in the first phase of the detection light and a grayscale image in the second phase of the reflected light.

In other words, as an example of acquiring the depth image using the IToF principle, the depth camera collects the light reflected from the object area or the target object of light emitted from separate point light sources. The depth camera may obtain phase change information between the emitted light and the reflected light, and further, can obtain the depth image by depth processing based on the phase change information. For example, based on the phase change information, time slot information between the emitted light and the received reflected light may be transmitted. Based on the time slot information, depth information of the object area or the target object can be determined to obtain the depth image.

Specifically, the photoelectric signal reading circuit is controlled by a read control signal to output a pixel signal, where a pixel signal of each pixel unit includes a first phase pixel signal, a second phase pixel signal, a third phase pixel signal, and a fourth phase pixel signal, where phase differences between the read control signals corresponding to the first phase pixel signal, the second phase pixel signal, the third phase pixel signal, and the fourth phase pixel signal respectively are 90° successively, and the processing unit generates the sparse depth image based on the first phase pixel signal, the second phase pixel signal, the third phase pixel signal, and the fourth phase pixel signal, and the phase of the read control signal corresponding to the obtained first phase pixel signal is the same as the phase of the transmission pulse, thereby reliably achieving IToF detection of the sparse depth image.

It should be understood that a depth camera with a speckle light source obtains depth information of a target object or object area based on the IToF principle, and thus is inexpensive. In addition, the speckle light source contributes to guaranteeing the quality of the depth information. It should be further understood that, different from the area light source IToF camera, the speckle IToF camera has lower light emission power, higher energy density, and farther detection distance. In other words, sparse depth images are collected by the speckle IToF camera, but the array of separate point light sources also guarantees the low costs of this camera and the quality of depth information.

More specifically, the speckle IToF camera may include an emitting module, a receiving module, and a processing unit.

The emitting module may be configured to emit a speckle array (point light source array) to an object. The speckle array may include p mutually spaced apart speckles.

In addition, the receiving module may include an image sensor, the image sensor may include a sensor array, and the sensor array may include m*n pixel units, where each of the pixel units includes a CMOS photodiode and a photoelectric signal reading circuit, the photodiode is configured to receive the speckle array reflected by the object, and generate a corresponding photocurrent signal based on the speckle array, and a current intensity indicated by the photocurrent signal is positively correlated with a light intensity of light beam irradiation received by the photodiode. The photoelectric signal reading circuit is configured to read the photocurrent signal and output a corresponding pixel signal; and the processing unit is configured to receive the pixel signal and generate a sparse depth image based on the pixel signal, the number p of speckles indicates a resolution of the sparse depth image, and the processing unit is further configured to align an RGB image at a resolution of a*b with the sparse depth image, and fuse the aligned sparse depth image with the RGB image using a pre-trained image fusion model to obtain a dense depth image, where the dense depth image is at a resolution of a*b.

It should be understood that a conventional lidar (e.g., a dToF camera and a LiDAR) generally employs an avalanche photo diode (APD), such as a single-photon avalanche photo diode, while the embodiment of the present disclosure employs a CMOS photodiode, which is inexpensive, and the performance of the CMOS photodiode can guarantee the effect of IToF measurement.

It should be further understood that the resolution of the sparse depth image refers to the number of points or the number of depth values of the depth image, i.e., the number p of speckles or an approximate value of the number of speckles indicates the resolution of the sparse depth image. For example, the emitting module includes a light-emitting array with q light-emitting points and a light-emitting drive circuit controlled by an emission pulse signal to drive the q light-emitting points to emit light to generate the p speckles, where p=s*q, and s is an integer greater than or equal to 1. However, usually, a resolution of a two-dimensional image is characterized with the pixel number in two dimensions, for example, the RGB image of a*b. A dense fused image obtained using the fusion method in the embodiment of the present disclosure includes a*b pixels, and each pixel has depth information. Therefore, a*b indicates a resolution of the dense fused image.

In some other examples, the image fusion model is trained by: acquiring training samples, where the training samples include an aligned sparse depth image sample at a resolution of p, an RGB image sample at a resolution of a*b, and a dense depth image sample at a resolution of a*b; and training an object neural network with the aligned sparse depth image sample and the RGB image sample as inputs and with the dense depth image sample as a supervision condition, to obtain the image fusion model.

It should be understood that the depth camera and the RGB camera that collect the training samples may be calibrated to obtain camera parameters, and the sparse depth image sample may be aligned with the RGB image sample based on the camera parameters. The camera parameters of the depth camera and the RGB camera that collect the training samples may be the same as, and of course, may also be different from, camera parameters of a depth camera and an RGB camera that collect to-be-fused images.

In a specific example, the above training samples may be collected using a camera module including the depth camera and the RGB camera. In this case, the camera parameters of the depth camera and the RGB camera that collect the training samples may be the same as the camera parameters of the depth camera and the RGB camera that collect the to-be-fused images.

Accordingly, the fusing the aligned sparse depth image and the RGB image using the pre-trained image fusion model to obtain the dense depth image at the resolution of a*b may include: inputting the aligned sparse depth image and the RGB image into the pre-trained image fusion model to obtain the dense depth image at the resolution of a*b.

It should be understood that, as a terminal-to-terminal neural network model, the image fusion model improves the efficiency of image fusion, and improves the efficiency of data processing on the premise of guaranteeing the precision of image fusion.

In some other examples, the method for fusing depth images further includes: acquiring an image acquiring instruction of a three-dimensional image application program installed in a terminal device, the image acquiring instruction instructing the depth camera and the RGB camera to collect the sparse depth image and the RGB image respectively; and returning the dense depth image to the three-dimensional image application program.

It should be understood that the three-dimensional image application program may include any one of an image background blurring application, a three-dimensional image reconstruction application, a virtual reality application, or an augmented reality application.

For example, an operating system may be installed in the terminal device, and the three-dimensional image application program runs on the operating system. The operating system includes, but is not limited to, an embedded operating system, a real-time operating system, and the like. The three-dimensional image application program may be a system application program, or may be a third-party application program. For example, the camera module including the depth camera and the RGB camera may start to perform image collection in response to the image acquiring instruction of the three-dimensional image application program.

The three-dimensional image application program may issue an image acquiring instruction (in response to a user instruction or other associated instructions, or the like). The three-dimensional image application program may invoke the image fusion model to input the aligned sparse depth image and the RGB image into the image fusion model to obtain the dense depth image.

The three-dimensional image application program in this example provides more abundant user experience in three-dimensional images using the method for fusing depth images.

The solution of fusing depth images in an embodiment of the present disclosure is described in detail and in general above with reference to FIG. 1 to FIG. 3. The method for fusing depth images in other embodiments of the present disclosure will be described below by way of examples with reference to FIG. 4 to FIG. 5.

Figure 4:
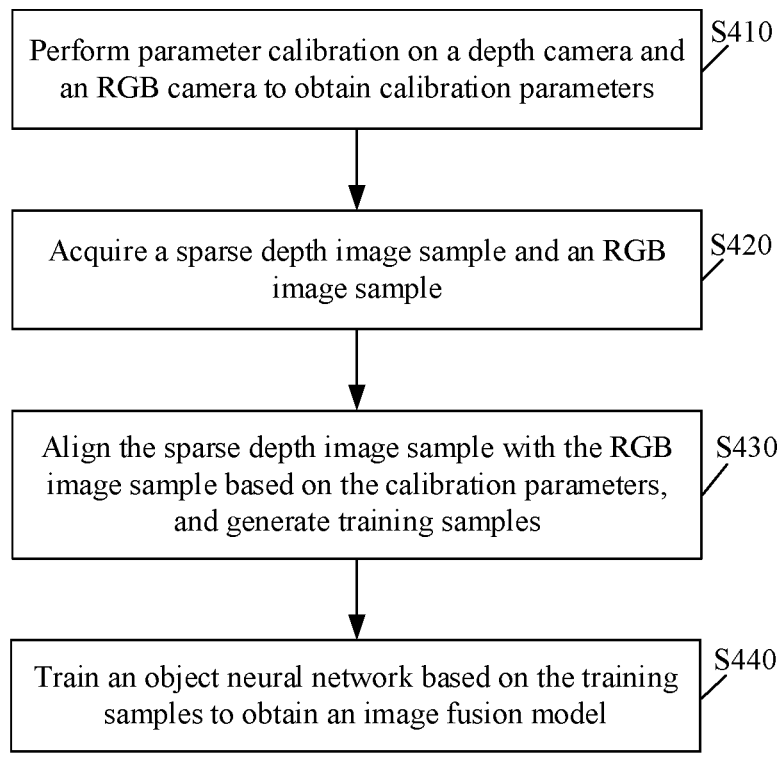
FIG. 4 is a schematic flowchart of a method for training an image fusion model in another embodiment of the present disclosure.

FIG. 4 is a schematic flowchart of a method for training an image fusion model in another embodiment of the present disclosure.

S410: performing parameter calibration on a depth camera and an RGB camera to obtain calibration parameters.

Specifically, the calibration parameters indicate a transformation relationship between a camera coordinate system and the world coordinate system, and the sparse depth image is aligned with the RGB image based on the calibration parameters, thereby improving the matching degree between the sparse depth image and the RGB image. The calibration parameters include a camera internal parameter and a camera external parameter. In general, the camera external parameter indicates the mapping from the world coordinate system to the camera coordinate system, and the camera internal parameter indicates the mapping from the camera coordinate system to an image coordinate system. In addition, the calibration of the parameters of the depth camera and the RGB camera may be performed before image collection is performed. The obtained calibration parameters may be pre-stored, and then the pre-stored calibration parameters may be obtained.

S420: acquiring a sparse depth image sample and an RGB image sample.

Specifically, the depth camera and the RGB camera that collect the training samples may be calibrated to obtain camera parameters, and the sparse depth image sample may be aligned with the RGB image sample based on the camera parameters. The camera parameters of the depth camera and the RGB camera that collect the training samples may be the same as, and of course, may also be different from, camera parameters of a depth camera and an RGB camera that collect to-be-fused images.

In a specific example, the above training samples may be collected using a camera module including the depth camera and the RGB camera. In this case, the camera parameters of the depth camera and the RGB camera that collect the training samples may be the same as the camera parameters of the depth camera and the RGB camera that collect the to-be-fused images.

S430: aligning the sparse depth image sample with the RGB image sample based on the calibration parameters, to generate training samples.

Specifically, the sparse depth image sample is aligned with the RGB image sample based on the camera parameters, thereby resulting in a high matching degree between the sparse depth image sample and the RGB image sample, and improving the fusion precision of the trained image fusion model.

S440: training an object neural network based on the training samples to obtain an image fusion model.

Specifically, the an object neural network may be trained with the aligned sparse depth image sample and the RGB image sample as inputs and with the dense depth image sample as a supervision condition, to obtain the image fusion model.

Figure 5:
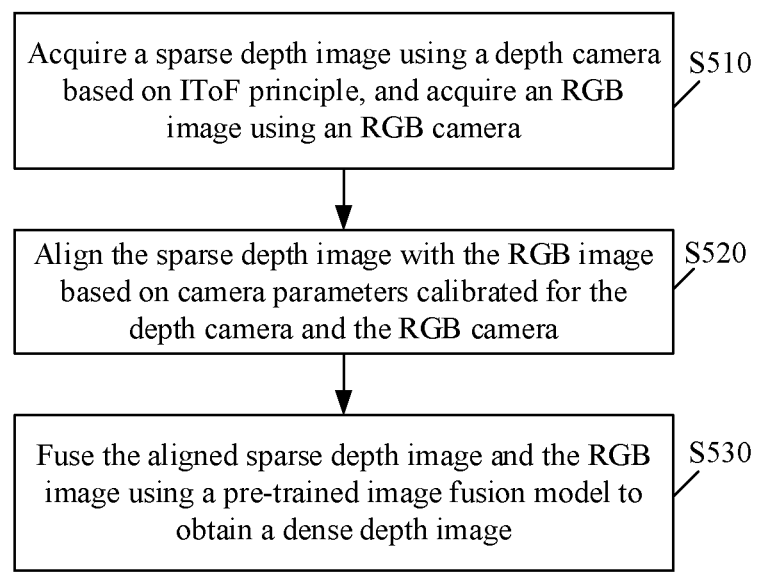
FIG. 5 is a schematic flowchart of the method for fusing depth images in another embodiment of the present disclosure.

FIG. 5 is a schematic flowchart of the method for fusing depth images in another embodiment of the present disclosure.

S510: acquiring a sparse depth image using a depth camera based on IToF principle, and acquiring an RGB image using an RGB camera.

Specifically, the RGB image may be an image of an object area collected using the RGB camera, and an imaging result of the object area may be recorded using pixels of the above three color channels. The sparse depth image may have a resolution of p, and the RGB image may have a resolution of a*b. The resolution of the sparse depth image refers to the number of points or the number of depth values of the depth image, i.e., the number p of speckles or an approximate value of the number of speckles indicates the resolution of the sparse depth image. For example, the emitting module includes a light-emitting array with q light-emitting points and a light-emitting drive circuit controlled by an emission pulse signal to drive the q light-emitting points to emit light to generate the p speckles, where p=s*q, and s is an integer greater than or equal to 1. However, usually, a resolution of a two-dimensional image is characterized with the pixel number in two dimensions, for example, the RGB image of a*b. A dense fused image obtained using the fusion method in the embodiment of the present disclosure includes a*b pixels, and each pixel has depth information. Therefore, a*b indicates a resolution of the dense fused image.

In addition, the sparse depth image may be obtained by the depth camera through image collection based on the IToF principle. The depth camera may be provided with a speckle light source, i.e., a light source formed by an array of separate point light sources. Further, detection light may be emitted from the point light source array for the object area, reflected light of the detection light may be acquired; and light change between the reflected light and the detection light may be applied to the IToF principle to obtain the sparse depth image.

S520: aligning the sparse depth image with the RGB image based on camera parameters calibrated for the depth camera and the RGB camera.

Specifically, the calibration parameters indicate a transformation relationship between a camera coordinate system and the world coordinate system, and the sparse depth image is aligned with the RGB image based on the calibration parameters, thereby improving the matching degree between the sparse depth image and the RGB image. The calibration parameters include a camera internal parameter and a camera external parameter. In general, the camera external parameter indicates the mapping from the world coordinate system to the camera coordinate system, and the camera internal parameter indicates the mapping from the camera coordinate system to an image coordinate system. In addition, the calibration of the parameters of the depth camera and the RGB camera may be performed before image collection is performed. The obtained calibration parameters may be pre-stored, and then the pre-stored calibration parameters may be obtained.

S530: fusing the aligned sparse depth image and the RGB image using a pre-trained image fusion model to obtain a dense depth image.

Specifically, the aligned sparse depth image and the RGB image are inputted into the pre-trained image fusion model to obtain the dense depth image.

Figure 6:
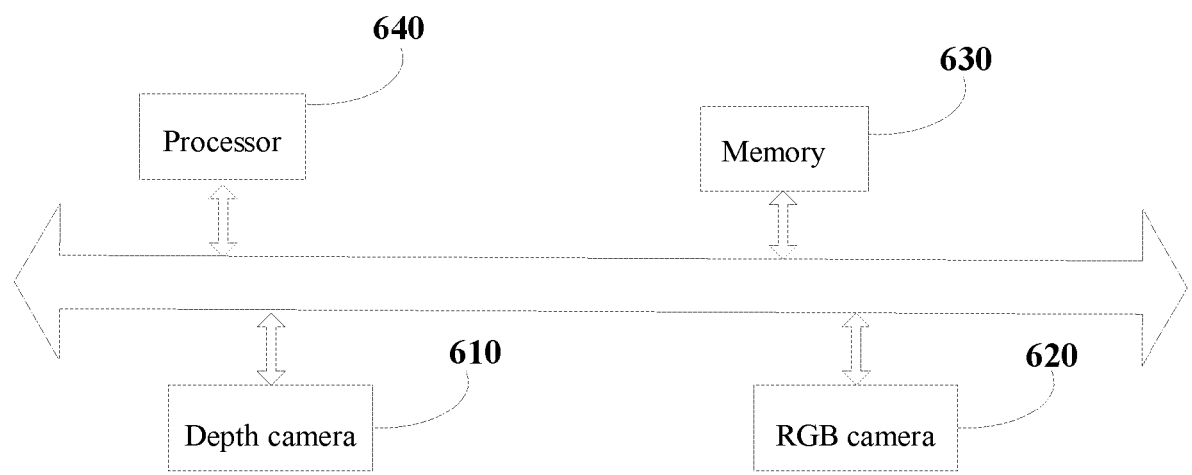
FIG. 6 is a schematic block diagram of a terminal device in another embodiment of the present disclosure.

A terminal device in another embodiment of the present disclosure will be specifically described below with reference to FIG. 6. FIG. 6 is a schematic block diagram of a terminal device, with actions and steps of the components thereof corresponding to the solutions described in FIG. 1 to FIG. 3. In other words, the solutions described in FIG. 1 to FIG. 3 and various implementations and effects are adapted to the terminal device in the present embodiment. The terminal device in FIG. 6 includes:

a depth camera 610 acquiring a sparse depth image based on IToF principle.

It should be understood that the sparse depth image may be obtained by a depth camera through image collection based on the IToF principle. The depth camera may be provided with a speckle light source, i.e., a light source formed by an array of separate point light sources. This depth camera may also be referred to as a speckle IToF camera. Sparse (speckle) point light sources are projected by the speckle IToF camera. Accordingly, sparse depth images are obtained, and the sparsity of the depth images collected by the speckle IToF camera depends on the number of points of the speckle light source.

an RGB camera 620 acquiring an RGB image.

It should be understood that RGB refers to colors that represent a red channel, a green channel, and a blue channel. The RGB camera is a camera that collects images based on an RGB color mode, and the images collected by the RGB camera are RGB images. Specifically, as a color standard in the industrial circle, the RGB color mode obtains various colors by changing the red channel, the green channel, and the blue channel, and superimposing them on each other. The RGB image may be an image of the object area collected using an RGB camera, and an imaging result of the object area may be recorded using pixels of the above three color channels.

a memory 630 storing a pre-trained image fusion model.

It should be understood that the memory may have an operating system installed therein and an application program running on the operating system. The depth camera and the RGB camera may acquire an image acquiring instruction of the operating system or the application program by a processor, execute a corresponding image acquiring function, and invoke the image fusion model.

a processor 640 aligning the sparse depth image with the RGB image, and fusing the aligned sparse depth image and the RGB image using the image fusion model to obtain a dense depth image.

It should be understood that training samples of the image fusion model are aligned sparse depth image sample and RGB image sample. The sparse depth image sample and the RGB image sample may be collected by the depth camera and the RGB camera, respectively. The depth camera may be the same camera or the same type of camera as the camera that collects the sparse depth image (to-be-fused image), and the RGB camera may also be the same camera or the same type of camera as the camera that collects the RGB image (to-be-fused image). When the camera that collects the training samples and the camera that collects the to-be-fused image are of the same type, a high matching degree between training sample data and to-be-fused image data can improve the image fusion effect of the model.

It should be further understood that the depth camera may include an emitting module, a receiving module, and a processing unit. The emitting module may be configured to transmit a speckle array (point light source array) to an object. The speckle array may include p mutually spaced apart speckles. In addition, the receiving module may include an image sensor, the image sensor may include a sensor array, and the sensor array may include m*n pixel units, where each of the pixel units includes a CMOS photodiode and a photoelectric signal reading circuit, the photodiode is configured to receive the speckle array reflected by the object, and generate a corresponding photocurrent signal based on the speckle array, and a current intensity indicated by the photocurrent signal is positively correlated with a light intensity of light beam irradiation received by the photodiode. The photoelectric signal reading circuit is configured to read the photocurrent signal and output a corresponding pixel signal; and the processing unit is configured to receive the pixel signal and generate a sparse depth image based on the pixel signal, the number p of speckles indicates a resolution of the sparse depth image, and the processing unit is further configured to align an RGB image at a resolution of a*b with the sparse depth image, and fuse the aligned sparse depth image with the RGB image using a pre-trained image fusion model to obtain a dense depth image, where the dense depth image is at a resolution of a*b.

It should be further understood that the emitting module may include a light-emitting array with q light-emitting points and a light-emitting drive circuit controlled by an emission pulse signal to drive the q light-emitting points to emit light to generate the p speckles, where p=s*q, and s is an integer greater than or equal to 1.

It should be further understood that the photoelectric signal reading circuit may be controlled by a read control signal to output the pixel signal, where a pixel signal of each pixel unit includes a first phase pixel signal, a second phase pixel signal, a third phase pixel signal, and a fourth phase pixel signal, where phase differences between the read control signals corresponding to the first phase pixel signal, the second phase pixel signal, the third phase pixel signal, and the fourth phase pixel signal respectively are 90° successively, and the processing unit generates the sparse depth image based on the first phase pixel signal, the second phase pixel signal, the third phase pixel signal, and the fourth phase pixel signal, and the phase of the read control signal corresponding to the obtained first phase pixel signal is the same as the phase of the transmission pulse.

In the solution of the embodiment of the present disclosure, since the depth camera can collect the sparse depth image, the cost of acquiring the sparse depth image using the depth camera based on the IToF principle is low, thereby reducing the cost of acquiring image depth information. The depth camera can be adapted to a low-cost terminal device, such as a mobile phone. In addition, the aligned sparse depth image and the RGB image are fused by the pre-trained image fusion model, thereby improving the precision of image fusion, and improving the efficiency of image processing. In addition, the sparse depth image and the RGB image are fused to obtain a dense depth image with higher precision, thereby enriching usage scenarios of the terminal device, and improving the user experience.

In addition, due to the high popularity of RGB cameras, the multiplexing of an RGB camera can be realized in a terminal device equipped with the RGB camera. In other words, in an application scenario where depth images are not required, the RGB camera can still be used to perform conventional image collection.

In addition, the solution of the embodiment of the present disclosure realizes a low-cost depth camera, such that in the industrial chain of terminal devices, the depth camera as a high-performance hardware product and the image fusion model as a high-performance software product can be fused together. In other words, the depth camera and the image fusion model may be provided to upstream manufacturers by the same downstream manufacturer as a high-performance image processing solution, whilst guaranteeing the production efficiency of the entire industrial chain.

In some other examples, the processor is specifically configured to: align the sparse depth image with the RGB image based on camera parameters calibrated for the depth camera and the RGB camera.

In some other examples, the depth camera and the RGB camera are provided in a camera module, and the camera parameters are obtained by camera calibration based on the camera module.

In some other examples, the depth camera is provided with a point light source array, and accordingly, the depth camera is specifically configured to: emit detection light with a first phase for an object area through the point light source array, and acquire reflected light with a second phase of the detection light, and determine the sparse depth image at least based on a difference between a grayscale image in the first phase of the detection light and a grayscale image in the second phase of the reflected light.

Specifically, the photoelectric signal reading circuit is controlled by a read control signal to output a pixel signal, where a pixel signal of each pixel unit includes a first phase pixel signal, a second phase pixel signal, a third phase pixel signal, and a fourth phase pixel signal, where phase differences between the read control signals corresponding to the first phase pixel signal, the second phase pixel signal, the third phase pixel signal, and the fourth phase pixel signal respectively are 90° successively, and the processing unit generates the sparse depth image based on the first phase pixel signal, the second phase pixel signal, the third phase pixel signal, and the fourth phase pixel signal, and the phase of the read control signal corresponding to the obtained first phase pixel signal is the same as the phase of the transmission pulse, thereby reliably achieving IToF detection of the sparse depth image.

In some other examples, the image fusion model is trained by: acquiring training samples, where the training samples include an aligned sparse depth image sample, an RGB image sample, and a dense depth image sample; and training an object neural network with the aligned sparse depth image sample and the RGB image sample as inputs and with the dense depth image sample as a supervision condition, to obtain the image fusion model.

In some other examples, the processor is specifically configured to: input the aligned sparse depth image and the RGB image into the pre-trained image fusion model to obtain the dense depth image.

In some other examples, the processor is further configured to: acquire an image acquiring instruction of a three-dimensional image application program installed in a terminal device, the image acquiring instruction instructing the depth camera and the RGB camera to collect the sparse depth image and the RGB image respectively; and return the dense depth image to the three-dimensional image application program.

In some other examples, the three-dimensional image application program includes any one of an image background blurring application, a three-dimensional image reconstruction application, a virtual reality application, or an augmented reality application.

The terminal device in the present embodiment is configured to implement the corresponding methods in the above method embodiments, and has the beneficial effects of the corresponding method embodiments. The description will not be repeated here. In addition, the description of the corresponding portions in the above method embodiments may be referred to for function implementation of each module in the apparatus of the present embodiment. The description will not be repeated here.

So far, specific embodiments of this subject matter have been described. Other embodiments fall within the scope of the appended claims. In some cases, actions disclosed in the appended claims may be executed in different orders and can still achieve desired results. In addition, the processes depicted in the figures are not necessarily required to achieve the desired results in the shown particular order or sequential order. In some embodiments, multitasking and parallel processing may be advantageous.

In the 1990s, an improvement of a technology can be clearly distinguished between a hardware improvement (e.g., an improvement on a circuit structure of a diode, a transistor, a switch, or the like) or a software improvement (e.g., an improvement on a process). However, with the development of the technology, at present, improvements of many processes can be regarded as direct improvements on a hardware circuit structure. Almost all designers obtain a corresponding hardware circuit structure by programming the improved process into a hardware circuit. Therefore, it cannot be said that an improvement on a process cannot be implemented with hardware entity modules. For example, a programmable logic device (PLD) (e.g., a Field Programmable Gate Array (FPGA)) is such an integrated circuit that its logical functions are determined by a user through programming a device. A designer "integrates" a digital system onto a PLD by programming by himself without requiring a chip manufacturer to design and manufacture a dedicated integrated circuit chip. Further, at present, instead of manually making integrated circuit chips, this kind of programming is mostly implemented by using "logic compiler" software, which is similar to a software compiler used in program development and compilation. The original code prior to the compilation must also be compiled in a specific programming language, which is referred to as a hardware description language (HDL), and there is not only one kind, but many kinds of HDL, e.g., ABEL (Advanced Boolean Expression Language), AHDL (Altera Hardware Description Language), Confluence, CUPL (Cornell University Programming Language), HDCal, JHDL (Java Hardware Description Language), Lava, Lola, MyHDL, PALASM, and RHDL (Ruby Hardware Description Language). At present, VHDL (Very-High-Speed Integrated Circuit Hardware Description Language) and Verilog are most commonly used. Those skilled in the art should further clearly know that it will be very easy to obtain a hardware circuit that implements the logical process only by slightly logically programming the process with the above hardware description languages and programming the process into an integrated circuit.

The controller may be implemented in any suitable manner. For example, the controller may take the form of a microprocessor or a processor and a computer readable medium storing computer readable program code (such as software or firmware) executable by the (micro)processor, a logic gate, a switch, an application specific integrated circuit (ASIC), a programmable logic controller, and an embedded microcontroller. Examples of the controller include, but are not limited to, the following microcontrollers: ARC 625D, Atmel AT91SAM, Microchip PIC18F26K20, and Silicone Labs C8051F320. A memory controller may also be implemented as a part of the memory control logic. Those skilled in the art also know that in addition to implementing the controller in a manner of purely computer readable program code, it is completely possible to logically program the process steps such that the controller implements a same function in the form of a logic gate, a switch, an application specific integrated circuit, a programmable logic controller, an embedded microcontroller, or the like. Therefore, such a controller may be regarded as a hardware component, and an apparatus included therein and configured to implement various functions may also be regarded as a structure within the hardware component. Or even, it may be regarded that the apparatus configured to implement various functions may be a software module for implementing the method, or may be a structure within the hardware component.

The system, apparatus, modules, or units illustrated in the above embodiments may be specifically implemented by a computer chip or entity, or by a product having a function. A typical implementing device is a computer. Specifically, the computer, e.g., may be a personal computer, a laptop computer, a cellular phone, a camera phone, a smart phone, a personal digital assistant, a medium player, a navigation device, an e-mail device, a game console, a tablet computer, a wearable device, or a combination of any device among these devices.

For ease of description, the above apparatus is described by dividing the apparatus into various units based on functions, and then describing the units respectively. Of course, when the present disclosure is implemented, the functions of the units may be implemented in a same piece or more pieces of software and/or hardware.

Those skilled in the art should understand that the embodiments of the present disclosure may be provided as a method, a system, or a computer program product. Accordingly, the present disclosure may take the form of an entirely hardware embodiment, an entirely software embodiment, or an embodiment combining software and hardware. Further, the present disclosure may take the form of a computer program product embodied on one or more computer usable storage mediums (including, but not limited to, a disk memory, a CD-ROM, an optical memory, and the like) having computer usable program code embodied thereon.

The present disclosure is described with reference to the flow charts and/or block diagrams of the method, device (system), and computer program product according to the embodiments of the present disclosure. It should be understood that each process and/or block in the flow charts and/or block diagrams as well as combinations of processes and/or blocks in the flow charts and/or block diagrams may be implemented by computer program instructions. The computer program instructions may be provided to a processor of a general purpose computer, a special purpose computer, an embedded processing machine, or other programmable data processing devices to produce a machine, thereby producing an apparatus for implementing the functions specified in one or more processes in the flow charts and/or one or more blocks in the block diagrams based on the instructions executed via the processor of the computer or other programmable data processing devices.

These computer program instructions may also be stored in a computer readable memory that can direct a computer or other programmable data processing devices to function in a particular manner, such that the instructions stored in the computer readable memory produce an article of manufacture including an instruction apparatus which implements the functions specified in one or more processes in the flow charts and/or one or more blocks in the block diagrams.

The computer program instructions may also be loaded onto a computer or other programmable data processing devices, to cause a series of operational steps to be executed on the computer or other programmable devices, to produce a computer implemented process, such that the instructions executed on the computer or other programmable devices provide steps for implementing the functions specified in one or more processes in the flow charts and/or one or more blocks in the block diagrams.

In a typical configuration, a computing device includes one or more processors (CPU), an input/output interface, a network interface, and an internal memory.

The internal memory may include forms, such as a volatile memory, a random-access memory (RAM), and/or a nonvolatile memory, e.g., a read-only memory (ROM) or a flash RAM, in a computer readable medium. The internal memory is an example of the computer readable medium.

The computer readable medium includes permanent and non-permanent mediums, removable and non-removable mediums, and information storage may be implemented by any method or technology. The information may be a computer readable instruction, a data structure, a program module, or other data. Examples of computer storage mediums include, but are not limited to, a phase-change random-access memory (PRAM), a static random-access memory (SRAM), a dynamic random-access memory (DRAM), a random-access memory (RAM) of other type, a read-only memory (ROM), an electrically erasable programmable read-only memory (EEPROM), a flash RAM or other internal memory technology, a compact disc read-only memory (CD-ROM), a digital versatile disc (DVD) or other optical storage, a magnetic cassette tape, a magnetic tape or disk storage or other magnetic storage devices, or any other non-transmission medium, which may be configured to store information accessible to a computing device. As defined herein, the computer readable medium excludes transitory media, e.g., a modulated data signal or carrier wave.

It should be further noted that the terms such as "comprising", "including" or any other variation thereof are intended to encompass non-exclusive inclusions, such that a process, a method, an article, or a device that includes a series of elements not only includes those elements, but also includes other elements that are not explicitly listed, or further includes elements that are inherent to such a process, method, article, or device. An element defined by the wording "comprises a . . . " does not, without more constraints, preclude the existence of other identical elements in the process, the method, the article, or the device that includes the element.

Those skilled in the art should understand that the embodiments of the present disclosure may be provided as a method, a system, or a computer program product. Accordingly, the present disclosure may take the form of an entirely hardware embodiment, an entirely software embodiment, or an embodiment combining software and hardware. Further, the present disclosure may take the form of a computer program product embodied on one or more computer usable storage mediums (including, but not limited to, a disk memory, a CD-ROM, an optical memory, and the like) having computer usable program code embodied thereon.

The present disclosure may be described in a general context of computer executable instructions executed by a computer, e.g., program modules. Generally, the program modules include routines, programs, objects, components, data structures, etc. that execute specific tasks or implement specific abstract data types. The present disclosure may also be practiced in distributed computing environments. In these distributed computing environments, a task is executed by remote processing devices connected through a communication network. In a distributed computing environment, the program modules may be located in local and remote computer storage mediums including storage devices.

The embodiments in the present specification are described progressively, identical or similar portions between the embodiments may be mutually referred to, and differences of each embodiment from other embodiments are mainly described in the embodiment. In particular, system embodiments are substantially similar to method embodiments, and therefore are relatively simply described. A part of description of the method embodiments may be referred to for relevant details.

The above description merely provides embodiments of the present disclosure, and is not intended to limit the present disclosure. For those skilled in the art, the present disclosure may have various modifications and alterations. Any modification, equivalent replacement, improvement, and the like made within the spirit and principle of the present disclosure should be encompassed within the scope of the appended claims of the present disclosure.

What is claimed is:

1. An apparatus for acquiring a depth image, comprising:
   an emitting module configured to emit a speckle array to an object, wherein the speckle array comprises p number of mutually spaced apart speckles;
   a receiving module comprising an image sensor, the image sensor comprising a sensor array, the sensor array comprising m*n pixel units, wherein each of the pixel units comprises a Complementary Metal Oxide Semiconductor (CMOS) photodiode and a photoelectric signal reading circuit, the photodiode is configured to receive the speckle array reflected by the object, and generate a corresponding photocurrent signal based on the speckle array, a current intensity indicated by the photocurrent signal is positively correlated with a light intensity of light beam irradiation received by the photodiode, and the photoelectric signal reading circuit is configured to read the photocurrent signal and output a corresponding pixel signal; and
   a processing unit configured to receive the pixel signal and generate a sparse depth image based on the pixel signal, the p speckles indicating a resolution of the sparse depth image, wherein the processing unit is further configured to align an RGB image having a resolution of a*b with the sparse depth image, and fuse the aligned sparse depth image with the RGB image using a pre-trained image fusion model to obtain a dense depth image, wherein the RGB image is a two-dimensional image acquired by an RGB camera with a and b being numbers of pixels in the two dimensions of the RGB image respectively, and the dense depth image has a resolution of a*b.

2. The apparatus for acquiring a depth image according to claim 1, wherein the emitting module comprises a light-emitting drive circuit and a light-emitting array having q number of light-emitting points, the light-emitting drive circuit is controlled by an emission pulse signal and drives the q light-emitting points to emit light to generate the p mutually spaced apart speckles, wherein p=s*q, and s is an integer greater than or equal to 1.

3. The apparatus for acquiring a depth image according to claim 2, wherein the photoelectric signal reading circuit is controlled by a read control signal to output the pixel signal, wherein the pixel signal of the each pixel unit comprises a first phase pixel signal, a second phase pixel signal, a third phase pixel signal, and a fourth phase pixel signal, wherein phase differences between the read control signals corresponding to the first phase pixel signal, the second phase pixel signal, the third phase pixel signal, and the fourth phase pixel signal respectively are 90°, and the processing unit generates the sparse depth image based on the first phase pixel signal, the second phase pixel signal, the third phase pixel signal, and the fourth phase pixel signal, and the phase of the read control signal corresponding to the obtained first phase pixel signal is the same as the phase of the emission pulse.

4. The apparatus for acquiring a depth image according to claim 3, wherein the photoelectric signal reading circuit only reads all pixel units of a pixel row irradiated by the speckle.

5. The apparatus for acquiring a depth image according to claim 3, wherein the processing unit is specifically configured to: align the sparse depth image with the RGB image.

6. The apparatus for acquiring a depth image according to claim 3, wherein the processing unit is further configured to: acquire a training sample, wherein the training sample comprises: a sparse depth image sample having a resolution of p, an RGB image sample having a resolution of a*b, the sparse depth image sample and the RGB image sample being aligned, and a dense depth image sample having a resolution of a*b, and
   accordingly, the processing unit is specifically configured to: train an object neural network with the aligned sparse depth image sample and the RGB image sample as inputs and with the dense depth image sample as a supervision condition, and obtain the image fusion model.

7. The apparatus for acquiring a depth image according to claim 6, wherein the processing unit is specifically configured to: input the aligned sparse depth image and the RGB image into the pre-trained image fusion model, and obtain the dense depth image.

8. The apparatus for acquiring a depth image according to claim 1, wherein the processing unit is further configured to:
   acquire an image acquiring instruction of a three-dimensional image application program installed in a terminal device, the image acquiring instruction instructing the receiving module and the emitting module to acquire the sparse depth image and the RGB image respectively; and
   send the dense depth image to the three-dimensional image application program, such that the three-dimensional image application program acquires three-dimensional image information based on the dense depth image.

9. The apparatus for acquiring a depth image according to claim 8, wherein the three-dimensional image application program comprises any one of an image background blurring application, a three-dimensional image reconstruction application, a virtual reality application, or an augmented reality application.

10. A terminal device, comprising:
    a depth camera for acquiring a sparse depth image having a resolution of p based on an indirect time of flight (IToF) principle, p being a number of mutually spaced apart speckles of a speckle array that the depth camera is configured to emit;
    an RGB camera for acquiring an RGB image having a resolution of a*b, the RGB image is a two-dimensional image with a and b being numbers of pixels in the two dimensions of the RGB image respectively;
    a memory for storing a pre-trained image fusion model; and
    a processor for aligning the sparse depth image having the resolution of p with the RGB image having the resolution of a*b, and fusing the aligned sparse depth image and the RGB image using the image fusion model to obtain a dense depth image having a resolution of a*b.

11. The terminal device according to claim 10, wherein the depth camera is provided with a point light source array having m*n pixel units configured to emit the speckle array, and the depth camera is specifically configured to: emit detection light with a first phase to an object through the point light source array having the m*n pixel units, acquire reflected light with a second phase of the detection light, and determine the sparse depth image having the resolution of p at least based on a difference between a grayscale image in the first phase of the detection light and a grayscale image in the second phase of the reflected light.

12. The terminal device according to claim 10, wherein the depth camera comprises:
an emitting module configured to emit the speckle array to an object; and
a receiving module comprising an image sensor, the image sensor comprising a sensor array, the sensor array comprising m*n pixel units, wherein each of the pixel units comprises a CMOS photodiode and a photoelectric signal reading circuit, the photodiode is configured to receive the speckle array reflected by the object, and generate a corresponding photocurrent signal based on the speckle array, a current intensity indicated by the photocurrent signal is positively correlated with a light intensity of light beam irradiation received by the photodiode, and the photoelectric signal reading circuit is configured to read the photocurrent signal and output a corresponding pixel signal.

13. The terminal device according to claim 12, wherein the emitting module comprises a light-emitting drive circuit and a light-emitting array having q number of light-emitting points, the light-emitting drive circuit is controlled by an emission pulse signal and drives the q light-emitting points to emit light to generate the p mutually spaced apart speckles, wherein p=s*q, and s is an integer greater than or equal to 1.

14. The terminal device according to claim 13, wherein the photoelectric signal reading circuit is controlled by a read control signal to output the pixel signal, wherein the pixel signal of the each pixel unit comprises a first phase pixel signal, a second phase pixel signal, a third phase pixel signal, and a fourth phase pixel signal, wherein phase differences between the read control signals corresponding to the first phase pixel signal, the second phase pixel signal, the third phase pixel signal, and the fourth phase pixel signal respectively are 90°, and the processing unit generates the sparse depth image based on the first phase pixel signal, the second phase pixel signal, the third phase pixel signal, and the fourth phase pixel signal, and the phase of the read control signal corresponding to the obtained first phase pixel signal is the same as the phase of the emission pulse.

15. The terminal device according to claim 14, wherein the photoelectric signal reading circuit only reads all pixel units of a pixel row irradiated by the speckle.

16. A method for fusing depth images, applied to a terminal device comprising a depth camera and an RGB camera, the method comprising:
acquiring a sparse depth image having a resolution of p using the depth camera based on an IToF principle, and acquiring an RGB image having a resolution of a*b using the RGB camera, p being a number of mutually spaced apart speckles of a speckle array that the depth camera is configured to emit, and the RGB image being a two-dimensional image with a and b being numbers of pixels in the two dimensions of the RGB image respectively;
aligning the sparse depth image having the resolution of p with the RGB image having the resolution of a*b; and
fusing the aligned sparse depth image and the RGB image using a pre-trained image fusion model to obtain a dense depth image having a resolution of a*b.

17. The method according to claim 16, wherein the aligning the sparse depth image having the resolution of p with the RGB image having the resolution of a*b comprises:
aligning the sparse depth image having the resolution of p with the RGB image having the resolution of a*b based on camera parameters calibrated for the depth camera and the RGB camera.

18. The method according to claim 16, wherein the depth camera is provided with a point light source array configured to emit the speckle array, and
accordingly, the acquiring the sparse depth image having the resolution of p using the depth camera based on the IToF principle comprises:
emitting detection light with a first phase to an object area through the freckle array, and acquiring reflected light with a second phase of the detection light; and
determining the sparse depth image having the resolution of p at least based on a difference between a grayscale image in the first phase of the detection light and a grayscale image in the second phase of the reflected light.

19. The method according to claim 16, wherein the image fusion model is trained by: acquiring a training sample, wherein the training sample comprises a sparse depth image sample having a resolution of p, an RGB image sample having a resolution of a*b, and a dense depth image sample having a resolution of a*b, the sparse depth image sample being aligned with the RGB image sample; and
training an object neural network with the aligned sparse depth image sample and the RGB image sample as inputs and with the dense depth image sample as a supervision condition, and obtain the image fusion model.

20. The method according to claim 19, wherein the fusing the aligned sparse depth image and the RGB image using the pre-trained image fusion model to obtain the dense depth image having the resolution of a*b comprises:
inputting the aligned sparse depth image and the RGB image into the pre-trained image fusion model to obtain the dense depth image having the resolution of a*b.

* * * * *